United States Patent [19]
Shin

[11] Patent Number: 5,335,071
[45] Date of Patent: Aug. 2, 1994

[54] APPARATUS FOR ENHANCING IMAGE QUALITY OF A VIDEOTAPE RECORDER USING MOTION ADAPTIVE METHOD

[75] Inventor: Hyun-ku Shin, Suwon, Rep. of Korea

[73] Assignee: SamSung Electronics Co., Ltd., Suwon, Rep. of Korea

[21] Appl. No.: 897,810

[22] Filed: Jun. 12, 1992

[30] Foreign Application Priority Data

Jun. 27, 1991 [KR] Rep. of Korea ............... 91-10774

[51] Int. Cl.⁵ ..................... H04N 5/91; H04N 5/92
[52] U.S. Cl. ...................... 348/392; 358/310; 358/330; 348/396; 348/425
[58] Field of Search ............ 358/138, 31, 310, 105, 358/12, 141, 330; H04N 5/91, 5/92

[56] References Cited

U.S. PATENT DOCUMENTS

| | | | |
|---|---|---|---|
| 4,621,236 | 11/1986 | Reitmeier et al. | 358/141 |
| 4,772,961 | 9/1988 | Ichinoi | 360/9.1 |
| 4,831,463 | 5/1989 | Faroudja | 358/31 |
| 4,943,848 | 7/1990 | Fukinuki | 358/12 |
| 5,031,030 | 7/1991 | Hurst, Jr. | 358/12 |
| 5,063,457 | 11/1991 | Ishikawa et al. | 358/330 |
| 5,113,262 | 5/1992 | Strolle | 358/323 |
| 5,161,030 | 11/1992 | Song | 358/330 |

FOREIGN PATENT DOCUMENTS 482945A 4/1992 United Kingdom ......... H04N 5/92

OTHER PUBLICATIONS

Research Disclosure on "Video Signal Bandwidth Compression", No. 183, Jul. 1979, pp. 382–384 (disclosed anonymously).
Journal of British I.R.E. on "Reduction of Television Bandwidth by Frequency-Interlace", Feb. 1960, pp. 127–136.

Primary Examiner—James J. Groody
Assistant Examiner—Chris Grant
Attorney, Agent, or Firm—Robert E. Bushnell

[57] ABSTRACT

The present invention relates to a motion adaptive picture image signal reproduction circuit which appropriately unfolds the brightness signal of a still picture image signal foldly recorded on a video tape, and outputs the brightness signal of a picture image signal unfolding recorded corresponding to a detected motion. According to the motion adaptive picture image signal reproduction circuit, the dynamic picture image recorded in a conventional VCR recording manner is reproduced as it is, while the still image having a greater number of image data in a restricted bandwidth, recorded in the frequency folding manner, is unfolded to a frequency band of the brightness signal by an unfolding carrier, thereby providing a recording/reproducing system having the improved resolution.

22 Claims, 1 Drawing Sheet

APPARATUS FOR ENHANCING IMAGE QUALITY OF A VIDEOTAPE RECORDER USING MOTION ADAPTIVE METHOD

BACKGROUND OF THE INVENTION

1. Field of the Invention

The present invention relates to a circuit for reproducing a picture image signal recorded on a video tape, more particularly, to a motion adaptive picture image reproduction circuit for adaptively reproducing a brightness signal of a picture image signal foldly recorded on a video tape to a corresponding motion. That is, the present invention relates to an apparatus for enhancing image quality of a video tape recorder using motion adaptive method which appropriately unfolds the brightness signal of a still picture image signal foldly recorded on the video tape and, otherwise, outputs the brightness signal of a picture image signal unfolding recorded corresponding to motion without any processing thereof.

2. Description of the Prior Art

In order to increase a resolution of a video cassette recorder (VCR), a conventional technique has been proposed in, for example, U.S. Pat. No. 5,113,262 filed by SAMSUNG Co. Ltd., on Aug. 17, 1990 which records a full bandwidth of television signal on a recording medium having a restricted bandwidth by folding high frequency component of the brightness signal on low frequency component thereof.

In this patent, the high frequency component of the brightness signal is modulated by a folding carrier, so that the folded brightness signal has a phase difference of 180 degrees between frames, scan lines and pixels, respectively. Therefore, when the high frequency component of the brightness signal folded on the low frequency component is reproduced, the high frequency component is demodulated by an unfolding carrier having the same phase and frequency as those of the folding carrier. Thus, the brightness signal of the picture image signal is unfolded to obtain a signal having the full frequency bandwidth.

According to the above-mentioned technique, however, all of the brightness signal are foldly processed regardless of whether a picture image is a dynamic picture or a still picture. As a result, a resolution of the picture image is deteriorated.

To solve the above problem, Korean Patent application No. 91-10836 filed by applicant has been proposed a recording technique, in which a folding manner of the brightness signal is changed in accordance with an amount of motion signal detected from a composite picture image signal such as a standard TV signal.

In this application, when the motion is detected from the brightness signal, the signal is considered as a dynamic picture image not to be subjected to the folding process. Alternatively, when no motion is detected from the brightness signal, the signal is considered as a still image to be subjected to the folding process.

More particularly, the proposed the adaptive processing method in which the motion detected from a TV signal applies the TV signal having a motion picture image to a conventional brightness processing portion of a video cassette recorder (VCR) and processor the TV signal having a motionless picture image by folding a high frequency component of the brightness signal onto the low frequency component thereof. The motion signal of the brightness signal, changed along the time axis, is recorded together with the folded brightness signal and a color signal so as to provide the recorded signal as a control signal in case that the brightness signal is unfolded in a full frequency bandwidth upon reproduction of the picture image recorded on the tape.

SUMMARY OF THE INVENTION

It is therefore an object of the present invention to provide a motion adaptive picture image reproduction circuit which detects a motion signal from a brightness signal separated by using a standard color brightness separator circuit, and executes a reproducing process differently depending on a motion picture or a still picture.

To accomplish the above object, the present invention provides a motion adaptive picture image signal reproduction circuit comprising:

a brightness signal unfolding circuit for unfolding a folded brightness signal having a full frequency bandwidth from an input brightness signal;

a delay circuit for delaying the input brightness signal by a predetermine time period;

a motion detector for detecting a motion signal from the brightness signal;

first and second controllable attenuator for selectively outputting the brightness signal from the brightness signal unfolding circuit or the delay circuit depending on the motion signal detected by the motion detector and an adder for adding and outputting the brightness signal selectively outputted from the first or second controllable attenuator.

The above and other objects, features and advantages will be apparent from the following description taken in consideration with the accompanying drawing.

DETAILED DESCRIPTION OF THE PREFERRED EMBODIMENT

Figure 1:
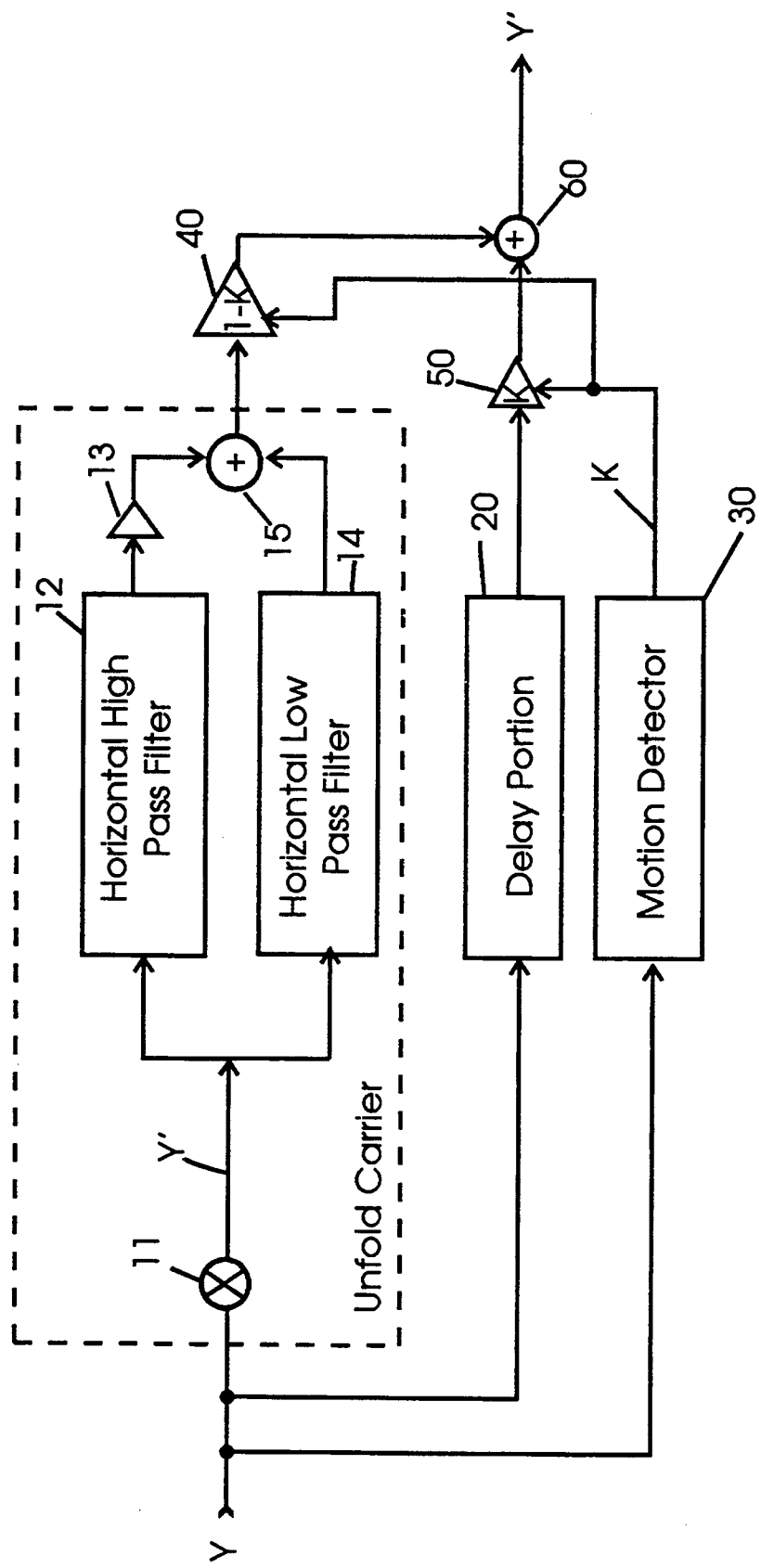
FIG. 1 is a circuit diagram showing a motion adaptive picture image signal reproduction circuit of a preferred embodiment according to the present invention.

Hereinafter, a preferred embodiment of the present invention will be described in detail with respect to the accompanying drawing.

FIG. 1 is a circuit diagram showing a motion adaptive picture image signal reproduction circuit according to the present invention.

In FIG. 1, a brightness signal Y recorded on a video tape, which is folded or not, depending on a motion, is separated from a color signal by means of an ordinary VCR reproducing circuit (not shown) and then applied to a brightness signal unfolding portion 10, a delay portion 20 and a motion detector 30.

The brightness signal Y applied to the brightness signal unfolding portion 10 is modulated by means of a modulator 11 using a unfolding carrier having the same phase and frequency as those of a folding carrier to obtain the brightness signal Y' having an originally occupied frequency band.

The folding brightness signal is modulated by a synchronous signal detected from a composite image signal and the unfolding carrier generated by a clock generator (not shown) under a same condition as that of the folding carrier employed for the folding process of the brightness signal, and then output as a brightness signal having a full bandwidth.

The brightness signal Y' unfolded in a full bandwidth by the modulator 11 of the brightness signal unfolding portion 10 is applied to a horizontal high pass filter 12 and a horizontal low pass filter 14, respectively. The horizontal high pass filter 12 includes a delay portion for delaying the brightness signal Y' in an unit of one pixel, and a subtractor for subtracting the output of the delay portion from the brightness signal Y' input to the horizontal high pass filter 12 to output the brightness signal having a higher frequency than a predetermined cutoff frequency (for example, 2.5 [MHz]). The horizontal low pass filter 14 includes a delay portion for delaying the brightness signal Y' in unit of one pixel, and an adder for adding the output of the delay portion and the brightness signal Y' of the horizontal low pass filter 14 so as to output the brightness signal having a lower frequency than the cutoff frequency previously set to the horizontal high pass filter 12. Here, the high frequency signal output from the horizontal high pass filter 12 is recovered as an original signal by a re-empasis 13 due to the deemphasis of the high frequency signal during the recording of the picture image signal. In order to improve a signal-to-noise ratio without affecting the low-band signal.

The high frequency signal output from the re-emphasis 13 and the low frequency signal from the horizontal low pass filter 14 are added by the first adder 15, and the added signal is then applied to the first controllable attenuator portion 40. The brightness signal input to the brightness signal unfolding portion 10, the delay portion 20 and the motion detector 30 contains a folded brightness signal having a motionless signal and an unfolded brightness signal having a motion signal.

Meanwhile, the delay portion 20 delays the input brightness signal Y by a predetermined time necessary for processing the signal by means of the brightness signal unfolding portion 10, and then outputs the delayed signal to the second controllable attenuator portion 50. The motion detector 30 detects an amount of motion from the input brightness signal. The predetermined delay time of the brightness signal delayed by the delay portion 20 is equal to a processing time of the brightness signal unfolding portion 10. When the motion detector 30 detects a motion picture, it outputs a level "1" which is referred as a control signal K. On the contrary, when the motion detector 30 detects a still picture, it outputs "0" level as the control signal K. The control signal K output from the motion detector 30 is applied to the control signal input terminals of the first and the second controllable attenuator portions 40 and 50. The first and the second controllable attenuator portions 40 and 50 attenuate the brightness signals from the first adder portion 15 and the delay 20 in the brightness signal unfolding portion according to the control signal K, respectively.

That is, in case the image signal is a motion picture, since the control signal K output from the motion detector 30 is level "1", the first controllable attenuator portion 40 is in low level (that is, $1-K=0$) while the second controllable attenuator portion 50 outputs the input signal as it is (that is, $K=1$) so that the brightness signal delayed by the delay portion 20 is output without any process.

Conversely, in case that the image signal is a still picture, since the control signal K output from the motion detector 30 is in the level "0", the first controllable attenuator portion 40 is turned on to enable full transmission of the brightness signal from the first adder portion 15 when $1-K=1$, while the second controllable attenuator portion 50 is cutoff to disable transmission of the brightness signal from the first adder portion 15 when $K=0$, so that the unfolded brightness signal from the brightness signal unfolding portion 10 can be provided.

In this case, a motion detecting time of the motion detector 30, a signal processing time of the brightness signal unfolding portion 10 and a delaying time of delay portion 20 must be the same. Accordingly, if the input brightness signal Y is a folded signal having a motionless signal, it is unfolded by the brightness signal unfolding portion 10 and then output through the first controllable attenuator portion 40. On the other hand, if the input brightness signal Y is a folded signal having a motion signal it is output through the delay portion 20 and the second attenuator portion 50.

Thus, the foldly recorded brightness signal and the non-folded brightness signal are output to a second adder 60 through the first or the second controllable attenuator portions 40 or 50 according to the presence of the motion or not, respectively.

The second adder 60 either receives and outputs the brightness signal selectively output from one of the first and second controllable attenuator portions 40 and 50 when there is motion or no motion (i.e. K is either "1" or "0"), or receives and adds the brightness signals output from both the first and second controllable attenuator portions 40 and 50 in order to output a brightness signal having the same full bandwidth as that of the brightness signal before the folding process.

As described above, according to the motion adaptive picture image signal reproduction circuit, the dyanmic picture image recorded in a conventional VCR recording manner is reproduced as it is, while the still image having a greater number of image data in a restricted bandwidth, recorded in the frequency folding manner, is unfolded to a frequency band of the brightness signal by using the unfolding carrier, thereby providing a recording/reproducing system having an improved resolution.

Although the invention has been described in its preferred embodiment with a certain degree of particularity, obviously many changes and variations are possible without departing from the spirit and scope of the invention.

Moreover, in the embodiment that the unfolded or delayed brightness signal are selectively output by the first and the second controllable attenuator portions, the first and the second controllable attenuator portions can be replaced by a hard switch.

Also, the motion signal detected by the motion detector 30 can be replaced by a separate motion signal recorded with to recorded with simultaneously recorded-with the brightness signal. In this instance the first and second controllable attenuator portions 40 and 50 is controlled by the separate motion signal instead of the motion detector 30.

What is claimed is:

1. An apparatus for enhancing image quality of a video tape recorder using motion adaptive method, comprising:
   signal unfolding means for providing a first brightness signal by unfolding a folded brightness signal having a full frequency bandwidth from an input brightness signal;

delay means for providing a delayed brightness signal by delaying the input brightness signal for a delay period;

motion detector means for detecting a motion signal from the input brightness signal;

first and second controllable attenuator means for outputting said first brightness signal from said brightness signal unfolding means and said delayed brightness signal from said delay means in dependence upon said motion signal detected by said motion detector means; and adder means for adding the outputs of said first and second controllable attenuator means to provide an output brightness signal.

2. The apparatus as claimed in claim 1, wherein said signal unfolding means comprises:

modulator means for unfolding the folded brightness signal of the input brightness signal into a full frequency bandwidth in dependence upon an unfolding carrier;

means for dividing the brightness signal unfolded in a full bandwidth by said modulator means into high-band and low-band brightness signals;

reemphasis means for providing a recovered high-band brightness signal upon recovering a deemphasis signal from said high-band brightness signal without affecting the low-band brightness signal in a recording of said high-band brightness signal; and adder means for adding the low-band brightness signal and the recovered high-band brightness signal to provide said first brightness signal.

3. The apparatus as claimed in claim 1, wherein the input brightness signal input to the brightness signal unfolding means, the delay means and the motion detector means contains a folded brightness signal having a motionless signal and an unfolded brightness signal having a motion signal.

4. The apparatus as claimed in claim 1, wherein said delay period is equal to a processing time of the brightness signal unfolding means.

5. A motion adaptive frequency unfolding apparatus, comprising:

means for receiving a luminance signal representative of a brightness level of a picture image having a restricted bandwidth and comprising high frequency components and low frequency components, said high frequency components being folded over said low frequency components to establish said restricted bandwidth;

delay means for delaying said luminance signal for a delay period to provide a delayed luminance signal;

unfolding means coupled to receive said luminance signal, for unfolding the high frequency components from the low frequency components of said luminance signal to provide an unfolded luminance signal; and means for selectively enabling transmission of said delayed luminance signal and said unfolded luminance signal in dependence upon a motion coefficient indicative of motion from said picture image.

6. The motion adaptive frequency unfolding apparatus as claimed in claim 5, wherein said transmission means enables transmission of said delayed luminance signal if the picture image is a motion image, and said unfolded luminance signal if the picture image is a still image.

7. The motion adaptive frequency unfolding apparatus as claimed in claim 5, wherein said unfolding means comprises:

modulator means for unfolding the high frequency components from the low frequency components of said luminance signal in dependence upon an unfolding carrier signal to provide an intermediate luminance signal having a full frequency bandwidth;

first filter means for high-pass filtering said intermediate luminance signal to provide a high-band luminance signal;

second filter means for low-pass filtering said intermediate luminance signal to provide a low-band luminance signal;

reemphasis means for reemphasizing said high-band luminance signal to provide a reemphasized high-band luminance signal; and adder means for adding said reemphasized high-band luminance signal and said low-band luminance signal to provide said unfolded luminance signal.

8. The motion adaptive frequency unfolding apparatus as claimed in claim 5, further comprised of motion detector means for providing said motion coefficient representative of whether said picture image is one of the motion image and the still image.

9. A motion adaptive frequency unfolding method, comprising the steps of:

receiving a luminance signal representative of the brightness level of a picture image having a restricted bandwidth and comprising high frequency components and low frequency components, said high frequency components being folded over said low frequency components to establish said restricted bandwidth;

delaying said luminance signal for a delay period to provide a delayed luminance signal;

unfolding the high frequency components from the low frequency components of said luminance signal to provide an unfolded luminance signal; and enabling selective transmission of said delayed luminance signal and said unfolded luminance signal in dependence upon a motion coefficient indicative of motion from said picture image.

10. The motion adaptive frequency unfolding method as claimed in claim 9, wherein the step of unfolding the high frequency components further comprises the steps of:

unfolding the high frequency components from the low frequency components of said luminance signal in dependence upon an unfolding carrier signal to provide an intermediate luminance signal having a full frequency bandwidth;

high-pass filtering said intermediate luminance signal to provide a high-band luminance signal;

low-pass filtering said intermediate luminance signal to provide a low-band luminance signal;

reemphasizing said high-band luminance signal to provide a reemphasized high-band luminance signal; and adding said reemphasized high-band luminance signal and said low-band luminance signal to provide said unfolded luminance signal.

11. The motion adaptive frequency unfolding method as claimed in claim 10, wherein the transmission step enables transmission of said delayed luminance signal if the picture image is said motion image and said unfolded luminance signal if the picture image is said still image.

12. A motion adaptive frequency unfolding apparatus, comprising:
- means for receiving folded luminance signals having high-frequency components and low-frequency components, the high-frequency components being folded over the low-frequency components within a restricted bandwidth by a frequency folding process;
- means for detecting a motion coefficient corresponding to a motion signal from said folded luminance signals, said motion signal being indicative of motion of an image;
- unfolding means coupled to receive said folded luminance signals, for generating unfolded luminance signals by unfolding the high frequency components from the low frequency components of said folded luminance signals;
- means for delaying said folded luminance signals for a delay period to provide delayed luminance signals;
- means for enabling transmission of said delayed luminance signal and said unfolded luminance signal in dependence upon said motion coefficient.

13. The motion adaptive frequency unfolding apparatus as claimed in claim 12, wherein said motion coefficient is representative of one of a still image and a motion image.

14. The motion adaptive frequency unfolding apparatus as claimed in claim 13, wherein said transmission means enables transmission of said delayed luminance signals if said motion coefficient represents said motion image while disabling transmission of said unfolded luminance signals, and enables transmission of said unfolded luminance signals if said motion coefficient represents said still image while disabling transmission of said delayed luminance signals, said unfolded luminance signals having a full bandwidth as that of said folded luminance signals before the high-frequency components being folded over the low-frequency components by said frequency folding process.

15. The motion adaptive frequency unfolding apparatus as claimed in claim 13, wherein said transmission means comprises:
- first attenuator means for enabling transmission of said unfolded luminance signals if said motion coefficient represents said still image, and disabling transmission of said unfolded luminance signals if said motion coefficient represents said motion image;
- second attenuator means for enabling transmission of said delayed luminance signals if said motion coefficient represents said motion image, and disabling transmission of said delayed luminance signals if said motion coefficient represents said still image; and
- adder means for generating output luminance signals having as full a bandwidth as said folded luminance signals before the high-frequency components being folded over the low-frequency components by said frequency folding process by adding the outputs of said first and second attenuator means in dependence upon said motion coefficient.

16. The motion adaptive frequency unfolding apparatus as claimed in claim 13, wherein said unfolding means comprises:

modulator means for unfolding the high frequency components from the low frequency components of said folded luminance signals in dependence upon an unfolding carrier signal to provide intermediate luminance signals having a full bandwidth;
first filter means for high-pass filtering said intermediate luminance signals to provide high-band luminance signals;
second filter means for low-pass filtering said intermediate luminance signals to provide low-band luminance signals;
reemphasis means for reemphasizing said high-band luminance signals to provide reemphasized high-band luminance signals; and
adder means for adding said reemphasized high-band luminance signals and said low-band luminance signals to provide said unfolded luminance signals.

17. A motion adaptive frequency unfolding method, comprising the steps of:
receiving folded luminance signals having high-frequency components and low-frequency components, the high-frequency components being folded over the low-frequency components;
detecting a motion coefficient corresponding to a motion signal from said folded luminance signals, said motion signal being indicative of motion of an image;
generating unfolded luminance signals by unfolding the high frequency components from the low frequency components of said folded luminance signals;
delaying said folded luminance signals for a delay period to provide delayed luminance signals;
generating first attenuated luminance signals upon attenuation of magnitudes of said unfolded luminance signals in dependence upon said motion coefficient;
generating second attenuated luminance signals upon attenuation of magnitudes of said delayed luminance signals in dependence upon said motion coefficient; and
generating output luminance signals in dependence upon said first and second attenuated luminance signals.

18. the motion adaptive frequency unfolding method as claimed in claim 17, wherein said unfolded luminance signals generating step comprises the steps of:
unfolding the high frequency components from the low frequency components of said folded luminance signals in dependence upon an unfolding carrier signal to provide intermediate luminance signals having a full bandwidth;
high-pass filtering said intermediate luminance signals to provide high-band luminance signals;
low-pass filtering said intermediate luminance signals to provide low-band luminance signals;
reemphasizing said high-band luminance signals to provide reemphasized high-band luminance signals; and
adding said reemphasized high-band luminance signals and said low-band luminance signals to provide said unfolded luminance signals.

19. A motion adaptive frequency unfolding apparatus, comprising:
means for detecting a motion coefficient from folded luminance signals having high-frequency components and low-frequency components, the high-frequency components being folded over the low-frequency components with a restricted bandwidth, said motion coefficient being indicative of motion of an image;

means for generating unfolded luminance signals by unfolding the high frequency components from the low frequency components of said folded luminance signals;

means for delaying said folded luminance signals for a delay period to provide delayed luminance signals;

means for generating first and second attenuated luminance signals upon attenuation of magnitudes of said unfolded luminance signals and said delayed luminance signals in dependence upon said motion coefficient; and means for generating output luminance signals in dependence upon said first and second attenuated luminance signals.

20. The motion adaptive frequency unfolding apparatus as claimed in claim 19, wherein said first and second attenuated luminance signals means comprises:

first means for generating said first attenuated luminance signals upon attenuation of magnitudes of said unfolded luminance signals in dependence upon said motion coefficient; and second means for generating said second attenuated luminance signals upon attenuation of magnitudes of said delayed luminance signals in dependence upon said motion coefficient.

21. The motion adaptive frequency unfolding apparatus as claimed in claim 19, wherein said first and second attenuated luminance signals generating means comprises:

first attenuator means for enabling transmission of said unfolded luminance signals if said motion coefficient represents a still image, and disabling transmission of said unfolded luminance signals if said motion coefficient represents a motion image; and second attenuator means for enabling transmission of said delayed luminance signals if said motion coefficient represents said motion image, and disabling transmission of said delayed luminance signals if said motion coefficient represents said still image.

22. The motion adaptive frequency unfolding apparatus as claimed in claim 19, wherein said output luminance signals has as full a bandwidth as said folded luminance signals before the high-frequency components are folded over the low-frequency components and is generated in dependence upon said motion coefficient.

* * * * *